United States Patent
Arai

(10) Patent No.: US 8,985,856 B2
(45) Date of Patent: Mar. 24, 2015

(54) SIDE SEAL FOR LINEAR GUIDE APPARATUS AND LINEAR GUIDE APPARATUS

(75) Inventor: Kazumi Arai, Hanyu (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/989,072

(22) PCT Filed: Oct. 19, 2011

(86) PCT No.: PCT/JP2011/005848
§ 371 (c)(1),
(2), (4) Date: May 23, 2013

(87) PCT Pub. No.: WO2012/070185
PCT Pub. Date: May 31, 2012

(65) Prior Publication Data
US 2013/0251291 A1    Sep. 26, 2013

(30) Foreign Application Priority Data
Nov. 24, 2010    (JP) .................................. 2010-261164

(51) Int. Cl.
*F16C 33/00*        (2006.01)
*F16J 15/32*        (2006.01)
(Continued)

(52) U.S. Cl.
CPC ........... *F16C 29/086* (2013.01); *F16C 29/0633* (2013.01); *F16C 33/76* (2013.01); *F16C 2240/34* (2013.01)
USPC ........................................... 384/15; 277/560

(58) Field of Classification Search
CPC .... F16C 29/086; F16C 29/0633; F16C 33/76; F16C 2240/34
USPC ............... 277/560; 384/15, 16, 43–45, 49, 50
See application file for complete search history.

(56) References Cited

U.S. PATENT DOCUMENTS

| | | | |
|---|---|---|---|
| 5,634,722 A | 6/1997 | Yuasa et al. | |
| 6,705,430 B2 * | 3/2004 | Michioka et al. | 184/5 |

(Continued)

FOREIGN PATENT DOCUMENTS

| | | |
|---|---|---|
| CN | 101111347 A | 1/2008 |
| JP | 6-51549 U | 7/1994 |

(Continued)

OTHER PUBLICATIONS

International Preliminary Report on Patentability (PCT/IB/338 & PCT/IB/373) dated Jun. 20, 2013, including English translation of Document C2 (Japanese-language Written Opinion (PCT/ISA/237)) previously filed on May 23, 2013 (six (6) pages).
International Search Report dated Dec. 6, 2011 with English translation (four (4) pages).
(Continued)

*Primary Examiner* — Alan B Waits
(74) *Attorney, Agent, or Firm* — Crowell & Moring LLP

(57) ABSTRACT

The sealing performance by a side seal is improved by changing the sealing function of the side seal for a linear guide apparatus which includes, as constituting components, a seal member, a holder plate that holds the seal member, and a cover (a scraper) depending on its application of the side seal. Plural types of the seal members (1A to 1B) which have a difference in at least any one of the inclination, the material, the thickness, and the tip shape of lips (11*a* to 11*f*) are prepared as the seal members. Multiple numbers of the seal members among those seal members are appropriately selected, the same number of the covers and the same number of the holder plates are combined together to assemble the side seal.

14 Claims, 9 Drawing Sheets

(51) Int. Cl.
   *F16C 29/08* (2006.01)
   *F16C 29/06* (2006.01)
   *F16C 33/76* (2006.01)

(56) References Cited

U.S. PATENT DOCUMENTS

| | | | |
|---|---|---|---|
| 8,387,990 B2* | 3/2013 | Castleman et al. | 277/309 |
| 2008/0131036 A1 | 6/2008 | Keller et al. | |
| 2008/0144980 A1* | 6/2008 | Keller et al. | 384/15 |
| 2009/0102136 A1* | 4/2009 | Tones et al. | 277/560 |
| 2009/0245701 A1 | 10/2009 | Ogura et al. | |
| 2010/0059937 A1* | 3/2010 | Castleman et al. | 277/309 |
| 2012/0279388 A1* | 11/2012 | Schuller et al. | 92/165 R |

FOREIGN PATENT DOCUMENTS

| | | |
|---|---|---|
| JP | 9-42284 A | 2/1997 |
| JP | 2007-211900 A | 8/2007 |
| JP | 2008-138843 A | 6/2008 |
| JP | 2008-528895 A | 7/2008 |

OTHER PUBLICATIONS

Japanese-language Written Opinion (PCT/ISA/237) dated Dec. 6, 2011 (three (3) pages.
Japanese Office Action dated May 27, 2014, with English translation (Five (5) pages).
Chinese Office Action dated Mar. 20, 2014, with English Translation (fourteen (14) pages).
Chinese Office Action dated Nov. 14, 2014, with English translation (7 pages).

\* cited by examiner

SIDE SEAL FOR LINEAR GUIDE APPARATUS AND LINEAR GUIDE APPARATUS

TECHNICAL FIELD

The present invention relates to side seals fixed to both ends of a slider, in an actuation direction thereof, constituting a linear guide apparatus. The linear guide apparatus is an apparatus which includes a guide rail, the slider, and a plurality of rolling elements. The guide rail and the slider are disposed so as to face with each other and have therebetween rolling surfaces, respectively, that constitute a rolling channel for the rolling elements, and the rolling elements roll over such a rolling channel so that one of the guide rail and the slider takes a linear motion with respect to the other.

BACKGROUND ART

A conventional example of a linear guide apparatus is shown in FIG. 12. This linear guide apparatus includes a guide rail 100, a slider (also referred to as "bearing") 200, and a plurality of rollers (rolling elements) 300. The guide rail 100 and the slider 200 are disposed so as to face with each other and have therebetween rolling surfaces 110 and 210, respectively, which constitute a rolling channel for the rollers 300.

The slider 200 can be divided into a slider main body 201, end caps 202 fixed to both ends of the slider main body, and side seals 203 further fixed to both ends of the slider main body in the lengthwise direction of the guide rail 100. The rolling surfaces 210 are formed in the slider main body 201. The side seals 203 disposed at both ends in the linear-motion direction of the slider 102 have respective lips each sealing spaces between the slider 200 and the top face of the guide rail 100 and between the slider and both side faces of the guide rail 100.

The slider 200 also has return channels 221 for the rollers 300 and turn-over channels 222 which cause respective return channels 221 and respective rolling channels to be communicated with each other. The return channels 221 are formed in the slider main body 201 and the turn-over channels 222 are formed in each end cap 202. Female screws 205 which enable attachment of a table, etc., by means of screws are formed in the top face of the slider 200.

Attachment holes for a grease nipple 400 are formed in the side seals 203 and the end caps 202. A lubricant is introduced to an oil path of the end cap 202 through the grease nipple 400, so that the linear guide apparatus is lubricated. The side seals 203 and the end caps 202 are fixed to the slider main body 201 by bolts 500. Attachment holes 120 for enabling attachment of the guide rail 100 to a mounting object like a base by means of bolts are formed in the guide rail 100.

According to this linear guide apparatus, a circulation channel for the rolling elements is formed with the rolling channel, the return channel, and the turn-over channel. The rollers 300 circulate in the circulation channel, thereby allowing one of the guide rail 100 and the slider 200 to take a linear motion with respect to the other.

An example conventional side seal for such a linear guide apparatus has a metal plate and a rubber-made seal member having a base fixed on the metal holder plate. The lip of the seal member is brought into contact with the top face of the guide rail and both side faces thereof when in use.

Patent Document 1 discloses a technology that the holder plate (a casing) of the side seal and the seal member (a seal) with a lip (a sealing lip) are formed of different members, and a scraper which is disposed so as to face the external face of the guide rail with a gap from such an external face is provided at the opposite side of the holder plate for the seal member. The holder plate and the seal are engaged with each other by fitting of a protrusion and a recess. According to such a side seal, relatively large foreign materials are repelled by the scraper at first, and thus the sealing lip can have a longer life and an improved action.

Patent Document 2 discloses a side seal (a scraper) that includes two seal members having respective lips (the sealing lips) inclined in opposite directions to each other, apiece of supporting plate which supports such seal members, and a housing having recesses which receive the bases of such seal members and the supporting plate.

This side seal employs the above-explained structure in order to enable replacement of the seal members without a detachment of the whole slider (a guide carriage) from the guide rail (a guiding rail). Moreover, the supporting plate employs a structure which can support the side seal without deteriorating the function of the side seal in both cases in which the supporting plate supports the two seal members and in which the supporting plate supports only one seal member that is formed of a flexible material.

PRIOR ART DOCUMENT

Patent Document

Patent Document 1: JP 2007-211900 A
Patent Document 2: JP 2008-528895 A

SUMMARY OF THE INVENTION

Problem to be Solved

The side seals of Patent Documents 1 and 2 leave much for an improvement of the sealing performance by changing the sealing function depending on its application.

It is an object of the present invention to provide a side seal for a linear guide apparatus which includes, as constituting components, a seal member, a holder plate that holds the seal member, and a cover (a scraper), and which can improve the sealing performance by the side seal by changing the sealing function depending on its application.

Solution to the Problem

To accomplish the object above, according to a first aspect of the present invention, there is provided a constituting component of a side seal for a linear guide apparatus comprising a guide rail, the slider, and a plurality of rolling elements, in which the side seals are fixed to both ends of a slider in an actuation direction, the constituting component of the side seal for the linear guide apparatus comprising following configurations (1) to (4).

(1) wherein the constituting component comprises:
a cover including an upper member and side members facing with a top face of the guide rail and both side faces thereof, respectively, with gaps;
a seal member including a lip in contact with the top face and both side faces of the guide rail, and a base; and
a holder plate that holds the base;
(2) wherein the base includes an engaging portion formed in one face of the seal member in a thickness direction and engaged with the holder plate by fitting of a protrusion and a recess, the lip is inclined from the one face toward another face in the thickness direction, and the cover is disposed on the another face of the seal member in the thickness direction in contact with the another face of the seal member;

(3) wherein a plurality of the covers having a same shape are prepared, a plurality of the holder plates having a same shape are prepared, and plural types of the seal members having a difference in at least any one of an inclination, a material, a thickness, and a tip shape of the lip are prepared; and (4) wherein a plurality of the covers, a plurality of the holder plates, and a plurality of the seal members are combined together when in use.

According to the constituting component of the side seal for the linear guide apparatus according to the present invention, multiple seal members among the above-explained plural types of the seal members are appropriately selected, and are used in combination with the same number of the covers and the same number of the holder plates, so that the side seal having a different sealing function depending on its application can be assembled.

Advantageous Effects of the Invention

According to the constituting components of a side seal for a linear guide apparatus of the present invention, multiple numbers of seal members among the above-explained plural types of the seal members are appropriately selected, and the side seal is constituted by a combination of the same number of covers and the same number of holder plates, thereby improving the sealing performance by the side seal by changing the sealing function depending on its application.

DESCRIPTION OF EMBODIMENTS

Embodiments of the present invention will now be described with reference to the accompanying drawings.

Figure 1:
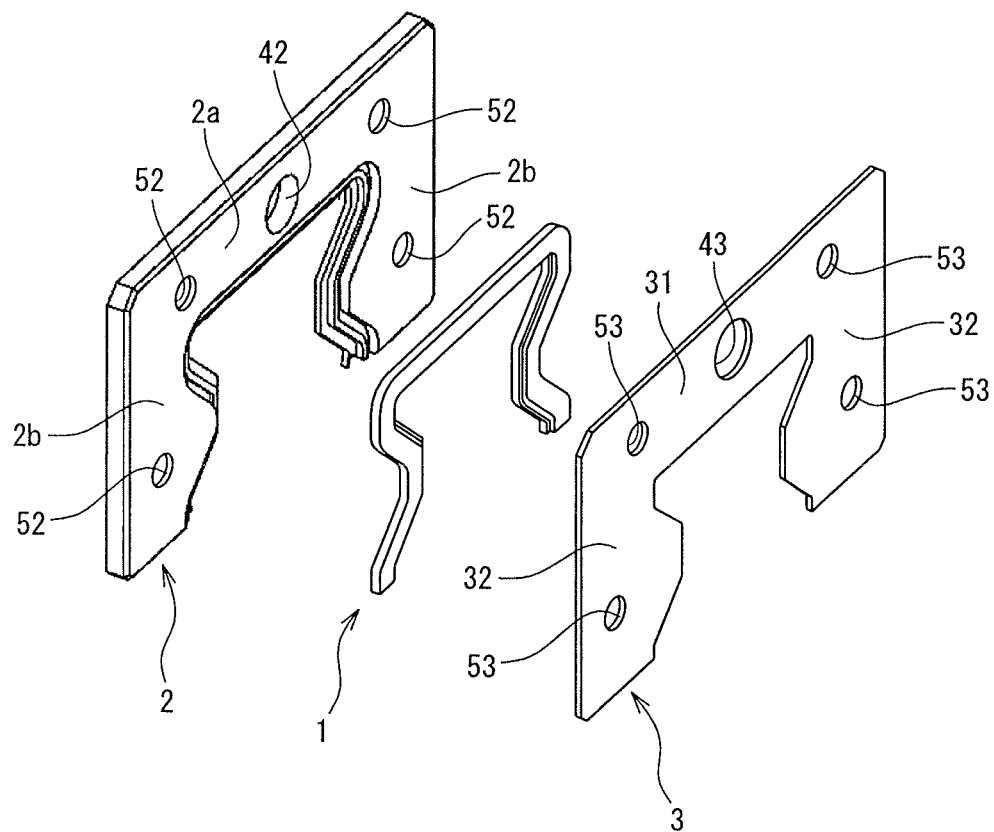
FIG. 1 is a perspective view showing constituting components of a side seal which are a seal member, a holder plate, and a cover according to an embodiment.
Figure 12:
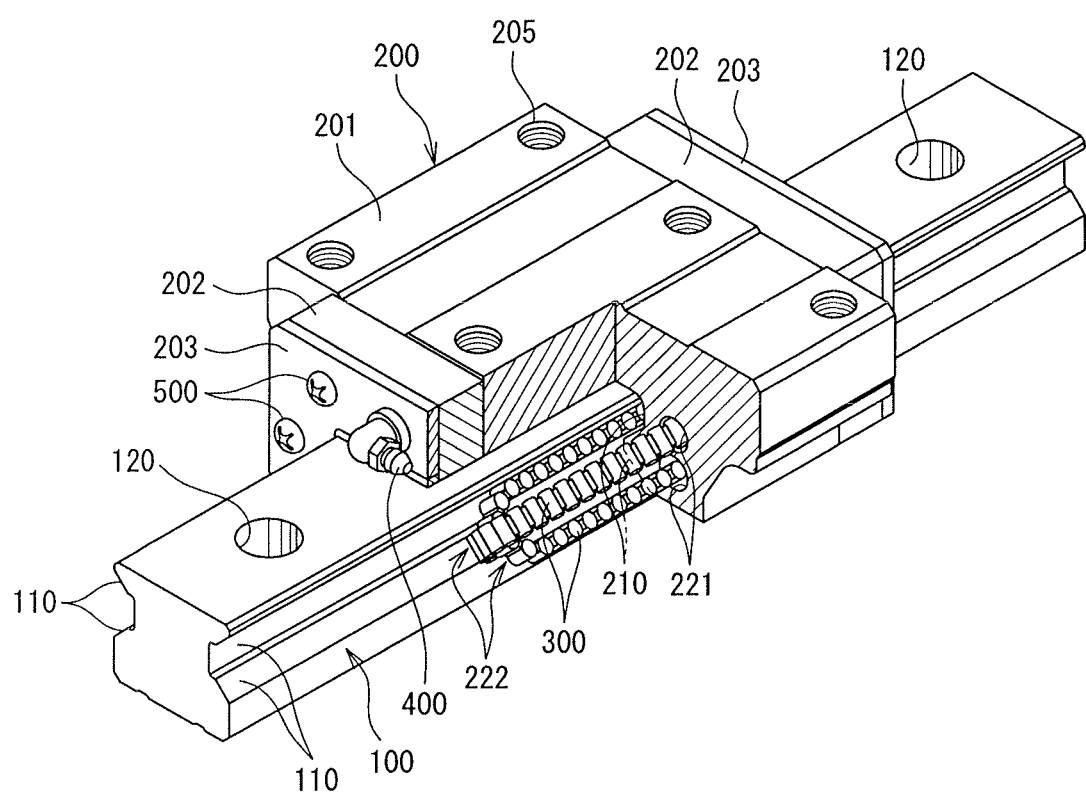
FIG. 12 is a partially sectional perspective view showing a conventional example of a linear guide apparatus.

Side-seal constituting components according to the present embodiment can constitute a side seal 203 for the above-explained linear guide apparatus shown in FIG. 12, and multiple numbers of respective seal members 1, holder plates 2, and covers 3 are prepared which are formed to have a shape shown in FIG. 1. Multiple numbers of the seal members 1 of different types are prepared, and multiple numbers of respective holder plates 2 and covers 3 of the same type are also prepared.

Figure 2:
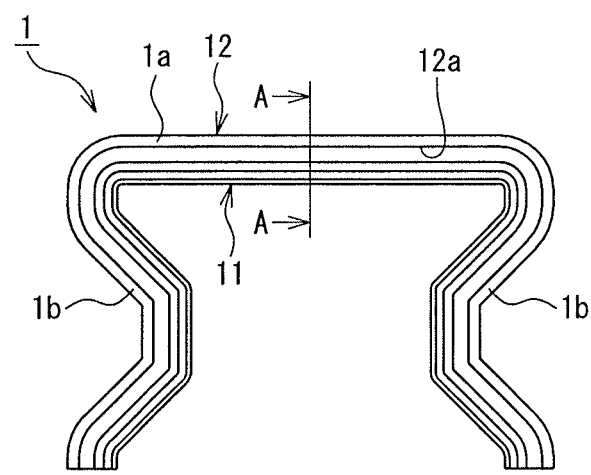
FIG. 2 is a front view showing the seal member according to an embodiment.

As shown in FIG. 2, the seal member 1 can be divided into an upper seal portion 1a to be disposed above a guide rail 100 (see FIG. 12), and side seal portions 1b to be disposed at right and left sides of the guide rail 100, respectively, when its arrangement is viewed from the front. The seal member 1 can also be divided into a lip 11 in contact with the top face of the guide rail and both side faces thereof, and a base 12 to be held by the holder plate 2 with the seal portions 1a and 1b being disposed so as to face the guide rail.

Six types of seal members 1A to 1F shown in FIGS. 3A to 3F are prepared as such a seal member 1. FIGS. 3A to 3F are each corresponding to a cross-sectional view taken along a line A-A in FIG. 2.

As shown in those figures, a base 12 of each of the seal members 1A to 1F has a recess (an engaging portion to be engaged with the holder plate 2 by fitting of a protrusion and a recess) 12a formed to have a first face 13 in the thickness direction. Such a recess 12a divides the base 12 into a tip 12b and a base end 12c.

Lips 11a to 11f of the seal members 1A to 1F are formed at the tips 12b of respective bases 12, and are inclined in the thickness direction from the first face 13 side toward a second face 14 side of the bases 12. A third face 15 that is the outermost (the side separated from the guide rail) surface of each of the seal members 1A to 1F is orthogonal to the first and second faces 13 and 14 of the base end 12c.

Figure 3A:
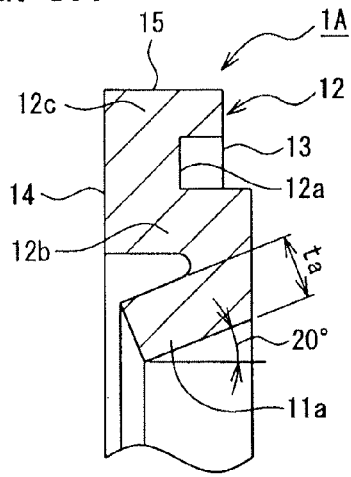
FIGS. 3A to 3F are cross-sectional views (corresponding to a cross-sectional view taken along a line A-A in FIG. 2) showing plural types of the seal members according to an embodiment.

The first seal member 1A shown in FIG. 3A is a standard seal member, and is formed in such a way that the inclination of the lip 11a relative to the face of the guide rail has substantially 20 degrees. Moreover, a tip face of the lip 11a is so formed as to be orthogonal to the inclination direction of the lip 11a.

Figure 3B:
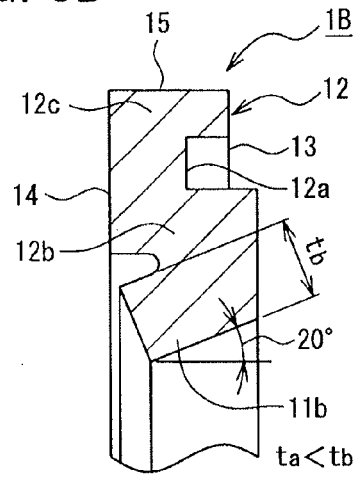

The second seal member 1B shown in FIG. 3B has the lip 11b having thickness tb greater than thickness ta of the lip 11a of the first seal member 1A, and is formed in such a way that the inclination of the lip 11b relative to the face of the guide rail is the same as that of the lip 11a of the first seal member 1A. Moreover, a tip face of the lip 11b is so formed as to be orthogonal to the inclination direction of the lip 11b.

Figure 3C:
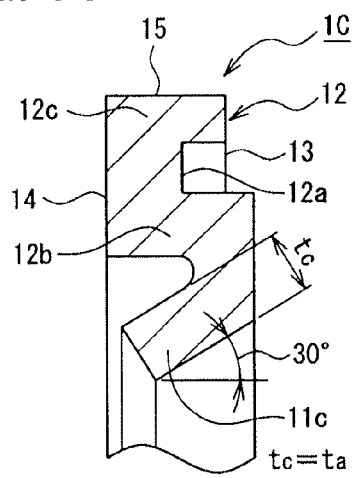

The third seal member 1C shown in FIG. 3C has the lip 11c having thickness tc same as the thickness ta of the lip 11a of the first seal member 1A, and is formed in such a way that the inclination of the lip 11c relative to the face of the guide rail has substantially 30 degrees. Moreover, a tip face of the lip 11c is so formed as to be orthogonal to the inclination direction of the lip 11c.

Figure 3D:
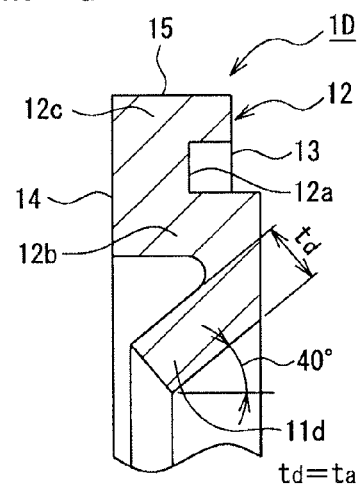

The fourth seal member 1D shown in FIG. 3D has the lip 11d having thickness td same as the thickness ta of the lip 11a of the first seal member 1A, and is formed in such a way that the inclination of the lip 11d relative to the face of the guide rail has substantially 40 degrees. Moreover, a tip face of the lip 11d is so formed as to be orthogonal to the inclination direction of the lip 11d.

Figure 3E:
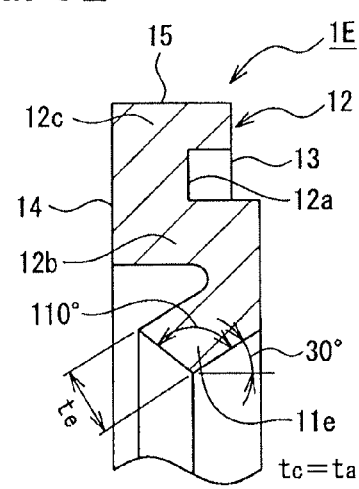

The fifth seal member 1E shown in FIG. 3E has the lip 11e having thickness to same as the thickness ta of the lip 11a of the first seal member 1A, and is formed in such a way that the inclination of the lip 11e relative to the face of the guide rail has substantially 30 degrees. Moreover, a tip face of the lip 11e is so formed as to be obtuse (substantially 110 degrees) relative to the inclination direction of the lip 11e.

Figure 3F:
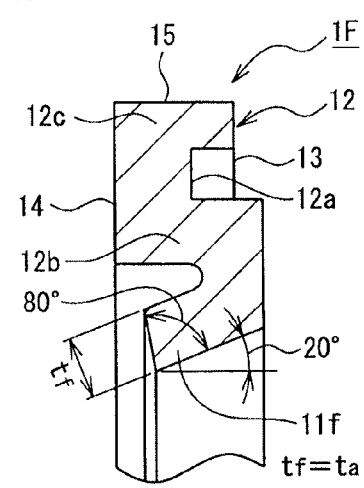

The sixth seal member 1F shown in FIG. 3F has the lip 11f having thickness tf same as the thickness ta of the lip 11a of the first seal member 1A, and is formed in such a way that the inclination of the lip 11f relative to the face of the guide rail has substantially 20 degrees. Moreover, a tip face of the lip 11f is so formed as to be acute (substantially 80 degrees) relative to the inclination direction of the lip 11f.

Figure 4:
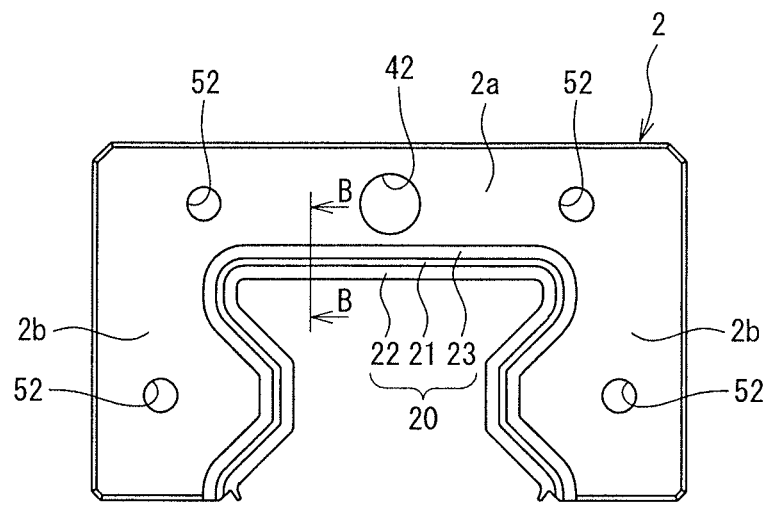
FIG. 4 is a front view showing the holder plate according to an embodiment.
Figure 5:
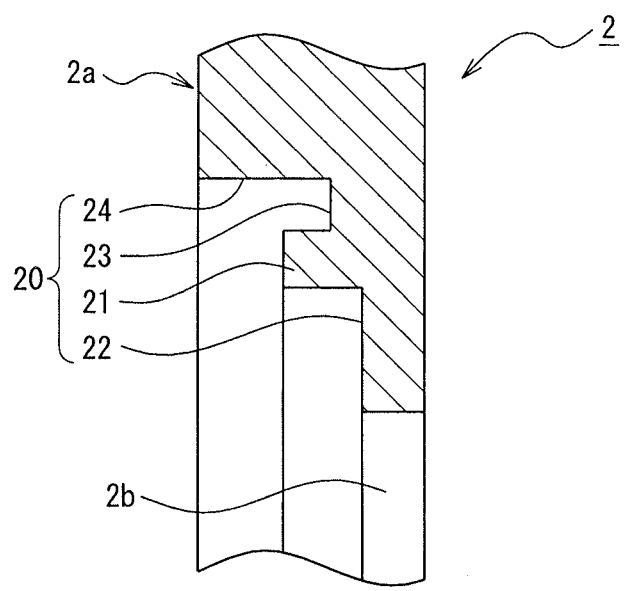
FIG. 5 is a cross-sectional view taken along a line B-B in FIG. 4.

As shown in FIG. 4 and FIG. 5, the holder plate 2 has a face formed to have a substantially same shape as that of the end cap 202 (see FIG. 12) constituting the slider 200 (see FIG. 12), and includes an upper portion 2a to be disposed above the guide rail 100 and side portions 2b to be disposed at right and left sides of the guide rail 100, respectively. Through holes 52 which allow the bolts 500 (see FIG. 12) to pass through, and a through hole 42 for attaching a grease nipple 400 (see FIG. 12) are formed in the upper portion 2a. The through holes 52 which allow the bolts 500 to pass through are also formed in respective side portions 2b. A holding portion 20 which holds the base 12 of the seal member 1 is formed at the inside (the guide rail side) of the holder plate 2.

The holding portion 20 includes a protrusion 21 to be fitted in the recess 12a of the base 12 of the seal member 1, a first holding face 22 formed at the inside of the protrusion 21, a second holding face 23 formed at the outside of the protrusion 21, and a third holding face 24 formed at the outside of the second holding face 23. The first holding face 22 and the second holding face 23 are parallel to the tabular face of the holder plate 2, and the third holding face 24 is orthogonal to the tabular face of the holder plate 2.

Figure 6:
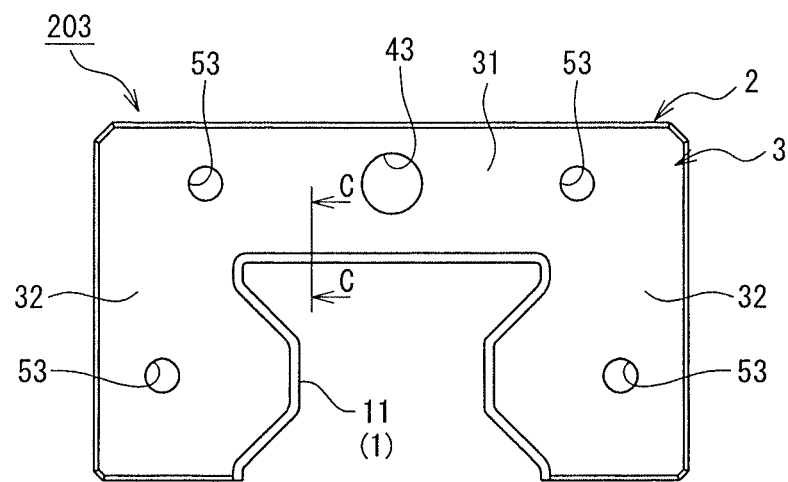
FIG. 6 is a front view showing the assembled side seal according to an embodiment.

As shown in FIG. 1 and FIG. 6, the cover 3 has a face formed to have a substantially same shape as that of the end cap 202 constituting the slider 200, and includes an upper member 31 facing with the top face of the guide rail with a gap therebetween, and side members 32 facing with right and left side faces of the guide rail 100, respectively, with a gap therebetween. Through holes 53 which allow the bolts 500 to pass through, and a through hole 43 for attaching the grease nipple 400 are formed in the upper member 31. The through holes 53 which allow the bolts 500 to pass through are also formed in respective side members 32.

According to the side-seal constituting components according to the present embodiment, multiple seal members among the seal members 1A to 1F are appropriately selected to be used in combination with the same number of the holder plates 2 and the same number of the covers 3, so that the side seal having different sealing functions depending on its application can be assembled.

Figure 7:
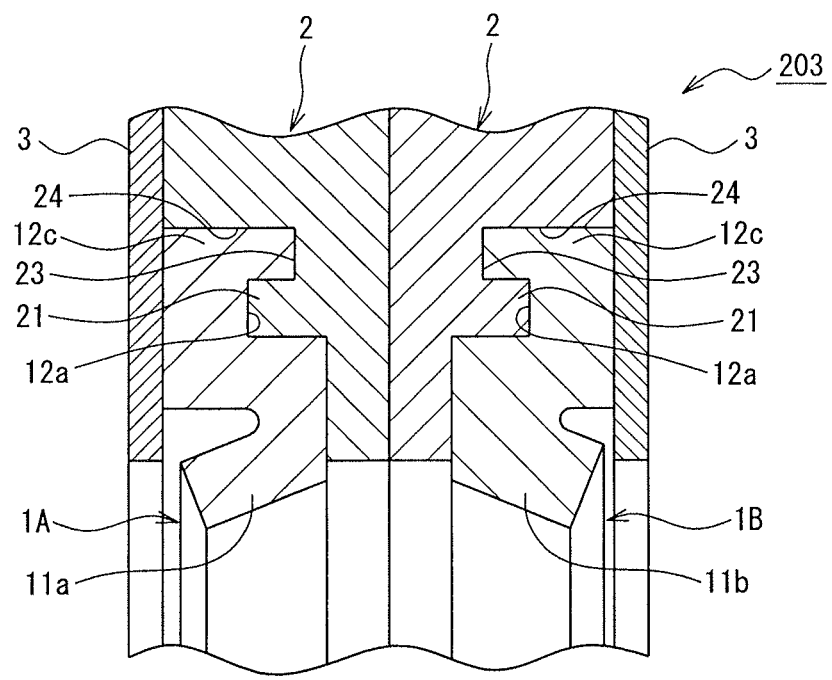
FIG. 7 is a cross-sectional view taken along a line C-C in FIG. 6.

For example, the side seal 203 shown in FIG. 6 and FIG. 7 can be assembled by using the two holder plates 2 and covers 3, the first seal member 1A, and the second seal member 1B. According to such a side seal 203, the first seal member 1A and the second seal member 1B have lips 11a and 11b with different thicknesses and disposed in such a way that the lips 11a and 11b are inclined in opposite directions separated from each other.

More specifically, as shown in FIG. 7, by fitting the recesses 12a of the bases 12 of the seal members 1A and 1B with the protrusions 21 of the holding portions 20 of the holder plates 2, respectively, the seal members 1A and 1B are held by the holder plates 2, respectively. At this time, the base end 12c is fitted in the recess formed by the third holding face 24, the second holding face 23, and the surface of the protrusion 21 facing with the third holding face 24. Moreover, the two holder plates 2 holding the seal members 1A and 1B are disposed with the surfaces opposite to the holding portions 20 facing with each other, respectively, and the covers 3 are disposed on the surfaces at the seal member 1A side and the seal member 1B side. Accordingly, the side seal 203 can be assembled.

Figure 8:
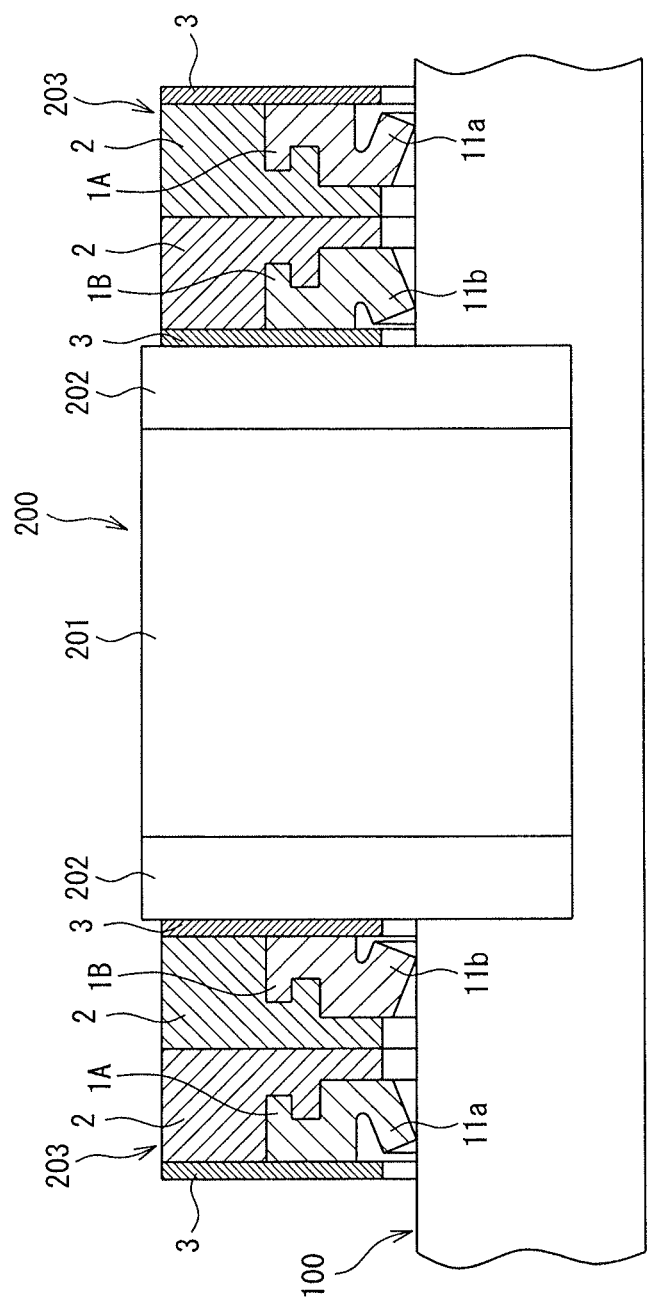
FIG. 8 is a schematic structural diagram showing a linear guide apparatus to which the side seals each assembled using a first seal member and a second seal member are attached.

Such side seals 203 are, as shown in FIG. 8, attached to each of both ends of the slider 200 in the actuation direction thereof which constitutes the linear guide apparatus. According to such side seals 203, the lip 11b of the second seal member 1B disposed at the inside and the lip 11a of the first seal member 1A disposed at the outside accomplish different sealing functions, thereby accomplishing good sealing performance and dust-proof performance.

Figure 9:
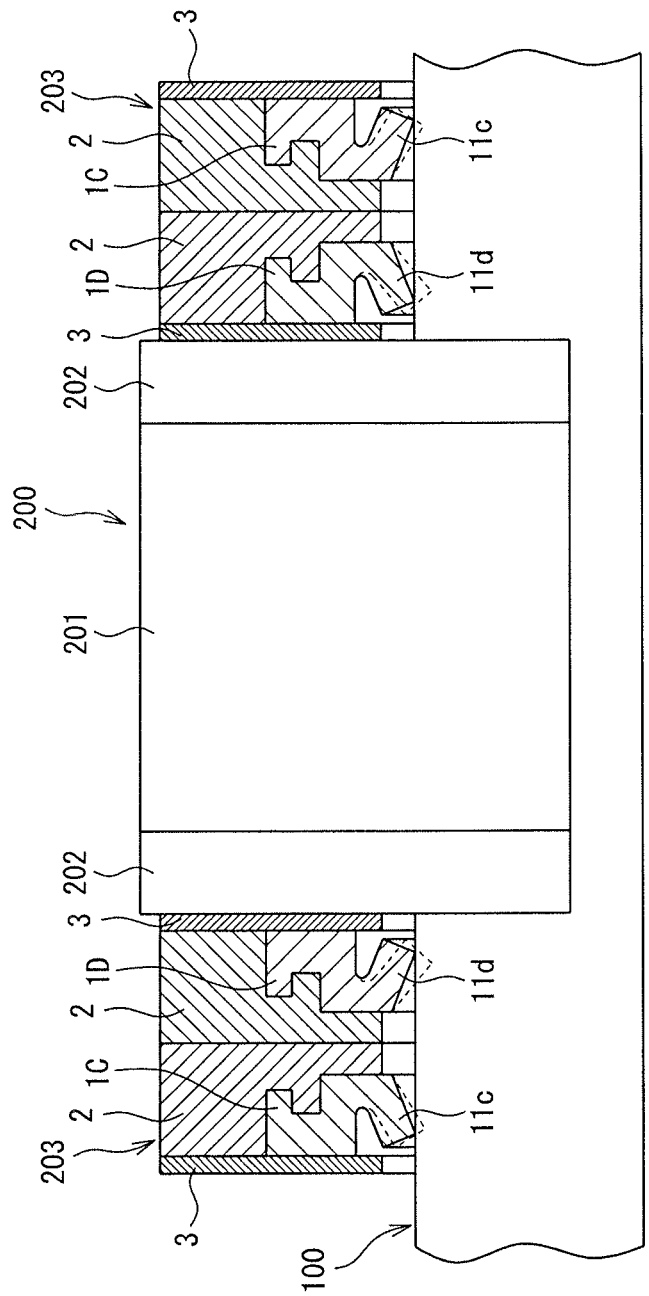
FIG. 9 is a schematic structural diagram showing a linear guide apparatus to which the side seals each assembled using a third seal member and a fourth seal member are attached.

According to the linear guide apparatus shown in FIG. 9, the side seals 203 which have the third seal members 1C and the fourth seal members 1D disposed in such a way that the lips 11c and 11d are inclined in opposite directions separated from each other are attached to both ends of the slider 200 in the actuation direction thereof. In this case, the contact pressure to the guide rail 100 by the lip 11d of the fourth seal member 1D disposed at the inside is larger than that of the lip 11c of the third seal member 1C disposed at the outside.

Figure 10:
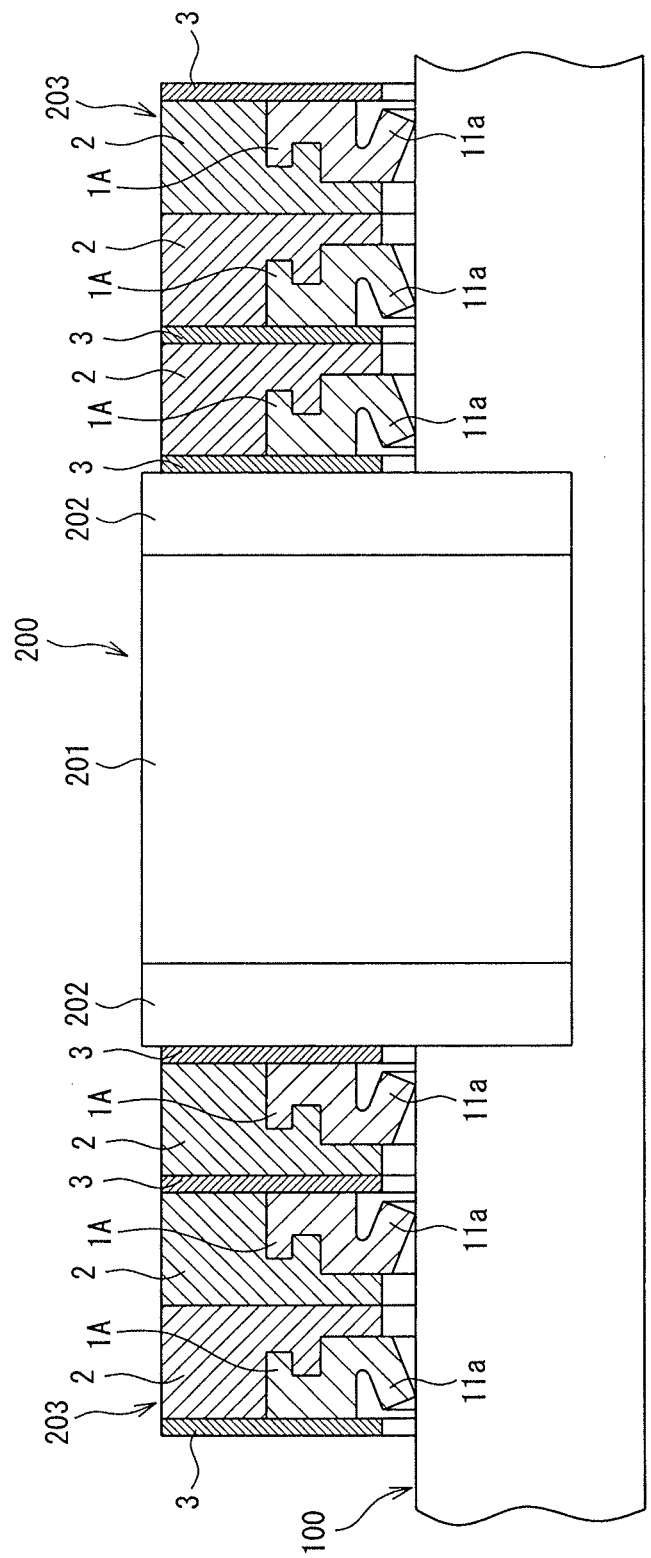
FIG. 10 is a schematic structural diagram showing a linear guide apparatus to which the side seals each assembled using the three first seal members are attached.

According to the linear guide apparatus shown in FIG. 10, the side seals 203 have the three holder plates 2 and three covers 3 and the three first seal members 1A. Individual seal members 1A are disposed in such a way that the lips 11a are inclined inwardly, inwardly, and outwardly in this order from the slider 200 side. Such side seals are attached to both ends of the slider 200 in the actuation direction thereof. In this case, by using the three seal members 1A, a further improved sealing performance can be obtained.

Figure 11:
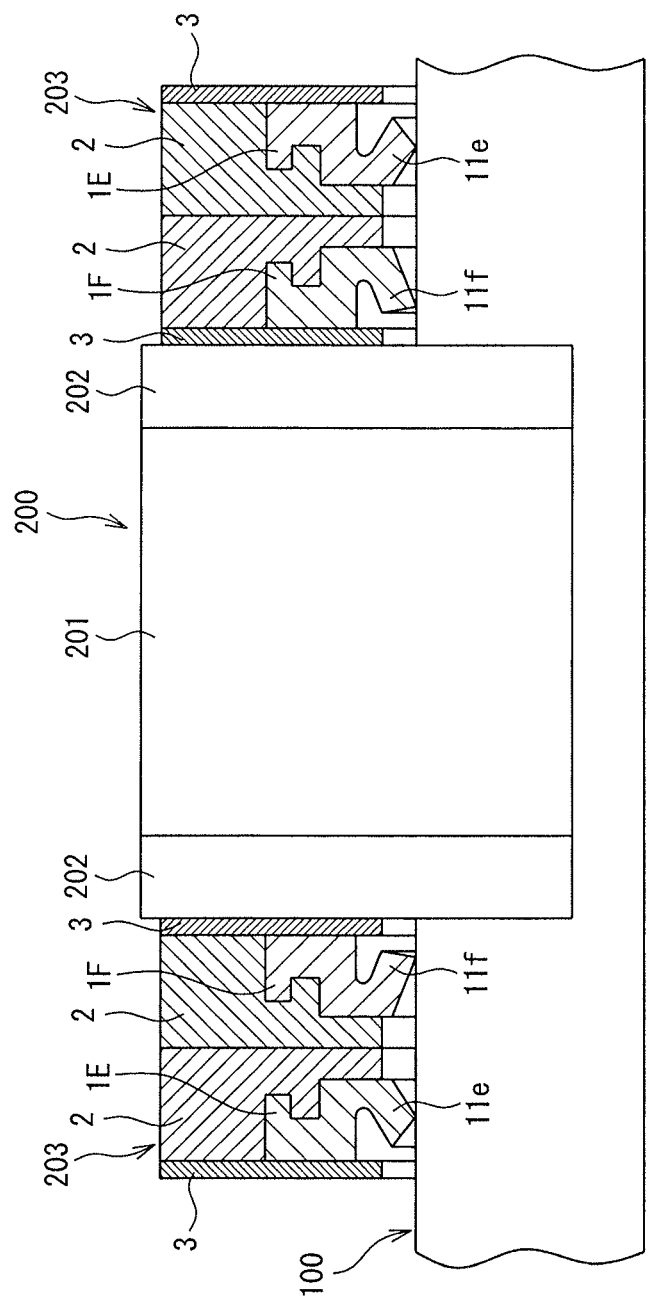
FIG. 11 is a schematic structural diagram showing a linear guide apparatus to which the side seals each assembled using a fifth seal member and a sixth seal member are attached.

According to the linear guide apparatus shown in FIG. 11, the side seals 203 which have the fifth seal members 1E and the sixth seal members 1F disposed in such a way that the lips 11e and 11f are inclined in opposite directions separated from each other are attached to both ends of the slider 200 in the actuation direction thereof. In this case, the lip 11f of the sixth seal member 1F disposed at the inside and the lip 11e of the fifth seal member 1E disposed at the outside accomplish different sealing functions.

According to this embodiment, although six types of seal members 1A to 1F which have a difference in at least any one of the inclination, the thickness, and the tip shape of the lip are prepared, the seal members which are in the same shape but have a difference in materials only may be prepared.

REFERENCE SIGNS LIST

1 Seal member
1A to 1F First to sixth seal members
1a Upper seal portion
1b Side seal portion
11 Lip
11a to 11f Lips of first to sixth seal members
12 Base
12a Recess of base (engaging portion)
12b Tip of base
12c Base end
13 First face of base
14 Second face of base
15 Third face of base
2 Holder plate
2a Upper portion of holder plate
2b Side portion of holder plate
20 Holding portion
21 Convexity
22 First holding face
23 Second holding face 24 Third holding face
3 Cover
31 Upper member of cover
32 Side member of cover
42 Through hole for attaching grease nipple
43 Through hole for attaching grease nipple
52 Through hole for allowing bolt to pass through
53 Through hole for allowing bolt to pass through
100 Guide rail
110 Rolling surface of guide rail
200 Slider
201 Slider main body
202 End cap
203 Side seal
205 Female screw
210 Rolling surface of slider
221 Return channel
222 Turn-over channel
300 Roller (rolling element)
400 Grease nipple
500 Bolt

The invention claimed is:

1. A side seal for a linear guide apparatus comprising a guide rail, a slider, and a plurality of rolling elements, in which the side seal is fixed to one end of the slider in an actuation direction, the side seal comprising:
a plurality of covers, each of the plurality of covers including an upper member and side members facing with a top face of the guide rail and both side faces thereof, respectively, with gaps;
a plurality of seal members each including a lip in contact with the top face and both side faces of the guide rail, the plurality of seal members each including a base, the plurality of seal members each including a first face in a thickness direction and a second face in the thickness direction; and
a plurality of holder plates that hold the bases, respectively, wherein
the bases each include an engaging portion
the engaging portions are formed in the first faces, respectively, and engaged with the plurality of holder plates, respectively, by fitting of a protrusion and a recess,
each of the lips is inclined from each of the first faces toward each of the second faces, and
the plurality of covers are disposed on the second faces
the plurality of covers having a same shape are prepared, the plurality of holder plates having a same shape are prepared, and the plurality of seal members having a difference in at least any one of a material, a thickness, and a tip shape of each lip are prepared,
the plurality of covers, the plurality of holder plates, and the plurality of seal members are combined together, and
the plurality of seal members include a first seal member having a first lip with a first contact angle of substantially 20 degrees with the guide rail, a second seal member having a second lip with a second contact angle of substantially 30 degrees with the guide rail, and a third seal member having a third lip with a third contact angle of substantially 40 degrees with the guide rail.

2. The side seal for the linear guide apparatus according to claim 1, wherein the first lip has a tip face that is formed as to be orthogonal relative to a first inclination direction of the first lip, the second lip has a tip face that is formed as to be obtuse relative to a second inclination direction of the second lip, and the third lip has a tip face that is formed as to be acute relative to a third inclination direction of the third lip.

3. The side seal for the linear guide apparatus according to claim 1, wherein
the first lip is thinner than the second lip,
the first seal member is disposed at an outside from the slider, and
the second seal member is disposed at an inside from the slider.

4. The side seal for the linear guide apparatus according to claim 1, wherein
the first seal member is disposed at an inside from the slider, and
the second seal member is disposed at an outside from the slider.

5. The side seal for the linear guide apparatus according to claim 1, wherein out of at least three seal members as the plurality of seal members each having a separate lip of same thickness, two of the at least three seal members are consecutively inclined inwardly from the slider and the other of the at least three seal members is inclined outwardly from the slider.

6. The side seal for the linear guide apparatus according to claim 1, wherein
a tip of the first lip is formed to be obtuse relative to a first inclination direction of the first lip,
a second tip of the second lip is formed to be acute relative to a second inclination direction of the second lip,
the first seal member is disposed at an outside from the slider, and
the second seal member is disposed at an inside from the slider.

7. A linear guide apparatus comprising a guide rail, a slider, a plurality of rolling elements, and a side seal fixed to one end of the slider in an actuation direction thereof, the side seal comprising:
a plurality of covers, each of the plurality of covers including an upper member and side members facing a top face of the guide rail and both side faces thereof, respectively, with gaps;
a plurality of seal members each including a lip in contact with the top face and both side faces of the guide rail, the plurality of seal members each including a base, the plurality of seal members each including a first face in a thickness direction and a second face in the thickness direction; and
a plurality of holder plates that hold the bases, respectively, wherein
the bases each include an engaging portion
the engaging portions are formed in the first faces, respectively, and engaged with the plurality of holder plates, respectively, by fitting of a protrusion and a recess,
each of the lips is inclined from each of the first faces toward each of the second faces,
the plurality of covers are disposed on the second faces, respectively,
the plurality of covers having a same shape are prepared, the plurality of holder plates having a same shape are prepared, and the plurality of seal members having a difference in at least any one of a material, a thickness, and a tip shape of each lip are prepared,
the plurality of covers, the plurality of holder plates, and the plurality of seal members are combined together, and
a first seal member including a first lip and a second seal member including a second lip as the plurality of seal members;

two holder plates as the plurality of holder plates; and
two covers as the plurality of covers, wherein
the first and second seal members are disposed in such a way that the first and the second lips are inclined in opposite directions separated from each other, and
a first thickness of the first lip and a second thickness of the second lip being not the same.

8. The linear guide apparatus according to claim 7, wherein the side seal comprises:
a first contact angle between the first lip and the guide rail and a second contact angle between the second lip and the guide rail are different.

9. The linear guide apparatus according to claim 7, wherein:
the seal side comprises a third holder plate, said three covers as the plurality of covers, and said first, said second, and a third seal member in this order from a slider side, as the plurality of seal members, and
the first, the second and the third seal members are disposed in such a way that the first lip is inclined inwardly from the slider, the second lip is inclined inwardly from the slider, and a third lip is inclined outwardly from the slider.

10. The linear guide apparatus according to claim 7, wherein
the first lip has a first tip face formed so as to be obtuse relative to a first inclination direction of the first lip;
the second lip has a second tip face formed so as to be acute relative to a second inclination direction of the second lip.

11. The linear guide apparatus according to claim 7, wherein
the first lip is thinner than the second lip,
the first seal member is disposed at an outside from the slider, and
the second seal member is disposed at an inside from the slider.

12. The linear guide apparatus according to claim 7, wherein
a first contact angle between the guide rail and the first lip is greater than a second contact angle between the guide rail and the second lip,
the first seal member is disposed at an inside from the slider, and
the second seal member is disposed at an outside from the slider.

13. The linear guide apparatus according to claim 7, further comprising a third seal member, wherein each seal member having a separate lip of same thickness and a same contact angle with the guide rail, two of the at least three seal members are consecutively inclined inwardly from the slider and the other of the at least three seal members is inclined outwardly from the slider.

14. The linear guide apparatus according to claim 7, wherein
a first tip of the first lip is formed to be obtuse relative to a first inclination direction of the first lip,
a second tip of the second lip is formed to be acute relative to a second inclination direction of the second lip,
the first seal member is disposed at an outside from the slider, and
the second seal member is disposed at an inside from the slider.

* * * * *